United States Patent
Penninckx et al.

(10) Patent No.: US 11,324,209 B2
(45) Date of Patent: May 10, 2022

(54) COMPOSITION TO PROMOTE MIGRATION OF ACARIDS

(71) Applicant: ACAR'UP SPRL, Woluwe-Saint-Lambert (BE)

(72) Inventors: Dorian Penninckx, Woluwe-Saint-Lambert (BE); Anne-Catherine Mailleux, Genval (BE)

(73) Assignee: ACAR'UP SPRL, Woluwe-Saint-Lambert (BE)

(*) Notice: Subject to any disclaimer, the term of this patent is extended or adjusted under 35 U.S.C. 154(b) by 44 days.

(21) Appl. No.: 16/767,352

(22) PCT Filed: Nov. 30, 2018

(86) PCT No.: PCT/EP2018/083152
§ 371 (c)(1),
(2) Date: May 27, 2020

(87) PCT Pub. No.: WO2019/106151
PCT Pub. Date: Jun. 6, 2019

(65) Prior Publication Data
US 2020/0390077 A1  Dec. 17, 2020

(30) Foreign Application Priority Data
Dec. 1, 2017  (EP) .................................... 17204944

(51) Int. Cl.
*A01M 1/02* (2006.01)
*A01M 1/10* (2006.01)
(Continued)

(52) U.S. Cl.
CPC .............. *A01M 1/02* (2013.01); *A01M 1/103* (2013.01); *A01N 25/34* (2013.01); *A01N 27/00* (2013.01);
(Continued)

(58) Field of Classification Search
CPC .................... A01M 1/02; A01M 1/103; A01M 2200/011; A01N 25/34; A01N 37/00;
(Continued)

(56) References Cited

U.S. PATENT DOCUMENTS 5,977,186 A    11/1999 Franklin
2009/0099022 A1  4/2009 Fernandez
(Continued)

FOREIGN PATENT DOCUMENTS

FR    3035775 A1    11/2016
WO    2019106151 A1  6/2019

OTHER PUBLICATIONS

Hanifah et al.; "Araricidal activity of Cymbopogon citratus and Azadirachta indica against house dust mites;" Asian Pacific Journal of Tropical Biomedicine; Oct. 1, 2011.
(Continued)

*Primary Examiner* — Trevor Love
(74) *Attorney, Agent, or Firm* — Vorys, Sater, Seymour and Pease LLP

(57) ABSTRACT

The current invention concerns an aqueous synergistic solution for promoting non-lethal migration of acarids from their habitat towards a carrier comprising an attractant for the attraction of acarids, wherein said attractant is limonene, one or more attraction enhancers chosen from the group citronellal, linalool, geranyl acetate, caryophyllene, caryophyllene oxide and/or neryl acetate, and an emulsifier, preferably polysorbate.
The current invention also concerns a method for attracting and holding acarids, comprising of the steps: providing a sheet having interstices sufficiently large and a thickness sufficiently large to hold acarids; and applying on said sheet the aqueous synergistic solution in a non-lethal dose per area. The synergistic solution promotes migration of acarids
(Continued)

Influence of acarids trapping kit on the symptoms of dust mite allergy from their habitat into said sheet, after which the sheet can be disposed or the acarids removed therefrom.

13 Claims, 1 Drawing Sheet

(51) Int. Cl.
*A01N 25/34* (2006.01)
*A01N 27/00* (2006.01)
*A01N 35/02* (2006.01)
*A01N 37/02* (2006.01)
*A01N 43/20* (2006.01)
*A01N 65/36* (2009.01)
*A01N 65/44* (2009.01)
*A01N 65/00* (2009.01)

(52) U.S. Cl.
CPC ............. *A01N 35/02* (2013.01); *A01N 37/02* (2013.01); *A01N 43/20* (2013.01); *A01N 65/36* (2013.01); *A01N 65/44* (2013.01); *A01M 2200/011* (2013.01)

(58) Field of Classification Search
CPC ........ A01N 35/02; A01N 37/02; A01N 43/20; A01N 65/36; A01N 65/44; A01N 65/00
See application file for complete search history.

(56) References Cited

U.S. PATENT DOCUMENTS

2010/0303940 A1  12/2010  Enan
2010/0310499 A1  12/2010  Skelton

OTHER PUBLICATIONS

ISR-WO associated with parent application PCT/EP2018/083152 and dated Jan. 31, 2019.

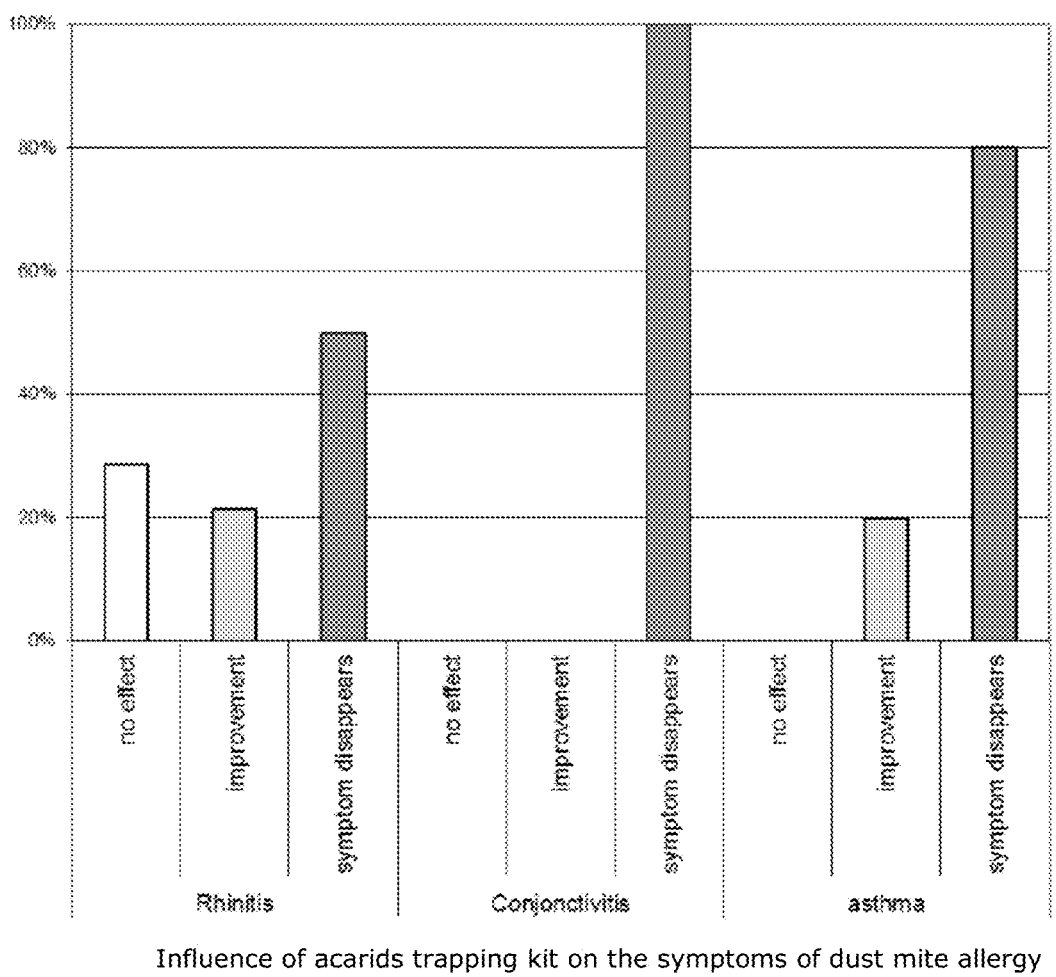
Influence of acarids trapping kit on the symptoms of dust mite allergy

COMPOSITION TO PROMOTE MIGRATION OF ACARIDS

FIELD OF THE INVENTION

The present invention relates to a method and a device for trapping acarids, such as dust mites. The invention in particular relates to compositions for attracting acarids and their uses and applications.

BACKGROUND OF THE INVENTION

Acarids are a taxon of arachnids that contains mites and ticks. In particular dust mites are widespread worldwide in the houses. They reproduce very prolifically and can produce important amount of allergens contained in their excrements. Therefore dust mites cause allergic symptoms (for a review on dust mites, see Colloff 2009), such as, for instance, itchy watery eyes, atopic dermatitis (eczema), asthma, allergic rhinitis, persistent stuffy nose or ears, Allergies due to dust mites can develop into fatal complaints.

Two species are mainly responsible for many allergies: The European house dust mite (*Dermatophagoides pteronyssinus*) and the American house dust mite (*Dermatophagoides farinae*) are two different species, but are not specifically confined to Europe or North America, they are widespread worldwide. Mites thrive in the environment provided by beds, covers, blankets, pillows, mattresses, carpets, armchairs, cushions, padded pieces used by human, also in places such as in teddy bears, cushions and blankets for dogs, cats and other pets, and homes in general.

A problem associated with places with living mites, is how to reduce allergic reactions, i.e. how to prevent or treat allergic reactions, from which users, humans and pets, may suffer, when coming into contact or in the vicinity of such contaminated places. Various sanitation methods are available to remove and/or kill acarids, such as dust mites. The most common and simple way of removing acarids consists in vacuuming. This method only removes acarids, but does not kill them and is to some extent dependent on the equipment used, and in particular relies on collection bags, which prevent spreading of acarids, and more important acarid derived allergens. Moreover, not all surfaces containing acarids are amenable to being treated in this way.

Another way of dealing with acarid infestations consists in the application of pesticides. While this method effectively kills the acarids, and hence prevents their spreading, the use of inherently toxic pesticides in a home environment is often not conceived acceptable. These methods however, merely kill the acarids, but do not remove them or their allergens. Moreover, similar to vacuum cleaning, not all surfaces can be or are acceptable for being treated in this way.

A common drawback in all conventional acarid sanitation methods to date is accessibility in combination with safety and efficacy. Indeed, for instance mattresses usually have a considerable thickness, such that either vacuuming or the application of pesticides may only result in superficial treatment. As dust mites may reside in the core of the mattress, such superficial treatment often proves not to be very efficacious. In recent years, mite attracting agents have been combined with pesticides to at least partially meet the accessibility requirements (JP2000336007). In view of the above, there exists a need to improve sanitation and to provide further methods for efficacious removal of acarids, such as dust mites. In particular, there is a need for methods and products that should be safe for human health, cost-effective, easily applicable as well as safe for the environment.

Various terpenes and terpenoids have been documented as acaricide, acaride attractant and acaride repellant depending on the substance and concentration with which they were applied. A composition of a pesticidal terpene mixture and a biological control agent, using limonene as one of its active compounds, is described in WO2014029747.

In view of the above, there exists a need for well-defined compositions which allow the controlled attraction and migration of acarids. In particular, these compositions should have long shelf life, high efficacy, safe for human health and the environment and cost-effective.

SUMMARY OF THE INVENTION

According to the present invention, a method is provided for efficacious elimination of acarids, such as dust mites. Herein, a synergistic composition is provided to attract acarids in a trap and then kill them after removal of the trap. The trapping device is composed of a fabric impregnated with a solution that is attractive for acarids.

Accordingly, in an aspect, the invention relates to a method for attracting and holding acarids, comprising the steps of:
   a) providing a sheet having interstices sufficiently large and a thickness sufficiently large to hold acarids; and
   b) applying on said sheet an aqueous solution comprising an attractant limonene, one or more attraction enhancers chosen from the group citronellal, linalool, Geranyl acetate, caryophyllene, caryophyllene oxide and/or Neryl acetate, preferably all, and an emulsifier, preferably polysorbate;

wherein said non-lethal dose per area attracts acarids promoting migration from their habitat towards said sheet.

In an embodiment, the method further comprises the step of contacting said sheet before and/or after step b) with an object suspected of containing acarids.

The invention relates to a synergetic composition for the attraction and migration of acarids. The composition according to claim 1 promotes the migration from a surface of an object which contains acarids towards said sheet which is disposed. This method does not employ toxic agents, such as pesticides.

This invention with a composition according to claim 1, is an aqueous solution of an attractant for the attraction of acarids, several attraction enhancers and an emulsifier. To ensure non-lethality, very low concentrations of said attractant, preferably limonene, need to be employed. On the other hand if the attractant concentration is too low then migration rates are low and migration speed is slow.

This invention with composition according to claim 1, comprises several attraction enhancers. Said attraction enhancers comprise substances, preferably citronellal, linalool, geranyl acetate, caryophyllene, caryophyllene oxide and/or neryl acetate, which improve migration speeds, migration rates and shelf life. Without being bound by theory, it is believed that very volatile attraction enhancers lead to high initial migration rates, but also quickly lose their attraction as they disperse. Highly volatile compounds can disperse before migration through thick mattresses has finished. Less volatile attraction enhancers lead to longer attraction durations, which lead to a larger migrated population.

This invention with composition according to claim 1 comprises an emulsifier. Said emulsifier disperses the attractant and attraction enhancers in water. In a preferred embodiment, said emulsifier comprises polysorbate 20. Said dispersion is important to ensure the low concentrations required for non-lethal attraction. The emulsifier concentration also had a synergistic effect on the acarid attraction when a spray was used. Without being bound by theory, it is believed that the emulsifier concentration affects the droplet diameter of the attractant and attraction enhancers. The droplet diameter affects the surface tension and volatility of liquids.

In an embodiment, said aqueous composition further comprises of softened water. Water showed a synergistic effect on acarid migration speeds when the sheet was sprayed, but not when it was soaked. Tests have shown that a relative humidity between 30% and 80%, preferably between 50% and 75% was found to improve acarid migration rates and migration speeds.

In another embodiment, the attractant enhancer citronellal is replaced by its alcohol citronellol or, preferably, a mix thereof.

In another embodiment, the acetate ester attractant enhancers geranyl acetate and neryl acetate are replaced with their alcohols geraniol and nerol or, preferably, a mix thereof.

In an embodiment, said composition comprising limonene, citronellal, linalool, geranyl acetate, caryophyllene, caryophyllene oxide and/or neryl acetate comprises essential oils from *Melissa officinalis* and/or *Cymbopogon flexuosus citraliferum*, preferably both. The inventors have found that these essential oils are particularly suited for use according to the invention as described herein. This finding is unexpected, as these essential oils are known in the art for their acarid and insect repellent features. Moreover, these oils are even frequently used as insecticides or acaricides. These two essential oils were found to work synergistically in attracting acarids.

DESCRIPTION OF FIGURES

FIG. 1 shows the influence of acarids trapping kit on the symptoms of dust mite allergy.

DETAILED DESCRIPTION

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of", as well as the terms "consisting essentially of", "consists essentially" and "consists essentially of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−20% or less, preferably +/−10% or less, more preferably +/−5% or less, and still more preferably +/−1% or less of and from the specified value, insofar such variations are appropriate to perform in the disclosed invention. It is to be understood that the value to which the modifier "about" or "approximately" refers is itself also specifically, and preferably, disclosed.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

In the following detailed description of the invention, reference is made to the accompanying drawings that form a part hereof, and in which are shown by way of illustration only of specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention relates to methods, products, compositions and kits for attracting, trapping, removing and/or eliminating acarids, in particular in a household setting. The present invention also relates to the use of such methods, products, compositions and kits for attracting, trapping, removing and/or eliminating acarids, in particular in a household setting.

It will be understood that the parameter ranges or values as defined herein refer to the average parameter range or value of the sheet, such that also non-uniform parameter ranges or values are envisaged. Preferably however, the parameter range or value of the sheet, such as thickness, porosity, density, color, as well as concentration of the compositions etc. is substantially uniform. Preferably, these parameters do not vary more than 25%, preferably no more than 10% from the average values.

The term "synergistic solution" as used herein, referrers to a multicomponent solution, which has a pronounced, enhanced effect, greater than the sum of separate effects of the components.

As used herein, the terms "trap" or "hold" in connection with acarids do not necessarily mean that the acarids are irreversibly trapped. In certain embodiment, the acarids which are attracted into the sheet may freely enter and leave the sheet. The attracting composition applied to the sheet however, serves the purpose of attracting as well as retaining or holding the acarids in the sheet.

As used herein, the term "acarids" refers to a subclass of arachnids that contains mites and ticks, and is also called Acari (or Acarina). Preferably, the acarids belong to the order of Acariformes. More preferably, the acarids belong to the family of Pyroglyphidae. Even more preferably, the acarids belong to the genus *Dermatophagoides*. Most preferably, the acarids are dust mites or house dust mites. These include the American dust mite and the European dust mite. Accordingly, in a preferred embodiment, the acarid as used herein is selected from the group consisting of *Dermatophagoides pteronyssinus* (the European dust mite) and *Dermatophagoides farinae* (the American dust mite). It will be understood that, while the terms European and American generally refer to the geographic origin or prevalence of these mites, the preferred mites according to the invention are not geographically restricted, as *Dermatophagoides pteronyssinus* and *Dermatophagoides farina* are not exclusively confined to Europe or North America.

The term "felt" refers to a non-woven cloth or fabric that is produced by matting, condensing and pressing synthetic and/or non-synthetic fibers.

The term "essential oil" is well known in the art. By means of further guidance, an essential oil is a concentrated hydrophobic liquid containing volatile aroma compounds from plants. Essential oils are also known as volatile oils, ethereal oils or aetherolea, or simply as the "oil of" the plant from which they were extracted. Essential oils of *Melissa officinalis, Cymbopogon citratus* and *Cymbopogon flexuosus citraliferum* are well known in the art, and readily obtainable from a variety of commercial sources.

As used herein, the term "Terpenes" refers to a large and diverse class of organic compounds, produced by a variety of plants and by some insects, including acarids. Terpenes are derived biosynthetically from units of isoprene, which has the molecular formula C5H8. The basic molecular formula of terpenes are multiples of that, (C5H8)n where n is the number of linked isoprene units. This is called the biogenetic isoprene rule or the C5 rule. "Monoterpenes" consist of two isoprene units and have the molecular formula C10H16. "Sesquiterpenes" consist of three isoprene units and have the molecular formula C15H24. Terpenes can be (multi)cyclic.

As used herein, the term "terpenoids" refers to a diverse class of organic compounds which are similar to terpenes but contain functional groups. Terpenes are hydrocarbons, whereas terpenoids contain additional functional groups. Terbenolds can be multicyclic.

As used herein, the term "limonene" refers to 1-methyl-4-(1-methylethenyl)-cyclohexene. Limonene is a chiral molecule, and biological sources produce one enantiomer: the principal industrial source, citrus fruit, contains D-limonene ((+)-limonene), which is the (R)-enantiomer (CAS Registry Number: 5989-27-5). Limonene as used herein may be D-limonene as well as the racemic mixture.

As used herein, the term "pinene" refers to a bicyclic monoterpene chemical compound of formula (1S,5S)-2,6,6-trimethylbicyclo[3.1.1]hept-2-ene. There are two structural isomers of pinene found in nature: α-pinene (CAS Registry Number: 80-56-8) and β-pinene, both of which are chiral. Pinene as used herein may be α-pinene, β-pinene, or a mixture thereof, such as a 50-50 mixture. Preferably, pinene is α-pinene.

As used herein, the term "Citronellal" refers to a monoterpenoid with IUPAC name 3,7-dimethyloct-6-en-1-al and molecular formula ($C_{10}H_{18}O$). The CAS registry number of Citronellal is 106-23-0.

As used herein, the term "Citronellol" refers to a monoterpenoid with IUPAC name 3,7-Dimethyloct-6-en-1-ol and molecular formula ($C_{10}H_{20}O$). The CAS registry number of Citronellol is 106-22-9.

As used herein, the term "Linalool" refers to two enantiomers of a naturally occurring terpene alcohol with IUPAC name 3,7-dimethyl-1,6-octadien-3-ol. The CAS registry number of Linalool is 78-70-6. Linalool has a stereogenic center at $C_3$ and therefore there are two stereoisomers: (R)-(−)-linalool is also known as licareol and (S)-(+)-linalool is also known as coriandrol. Linalool as used herein may be licareal, coriandrol or a mixture of both, such as a 50-50 mixture.

As used herein, the term "Geranyl acetate" refers to a monoterpene with IUPAC name 3,7-Dimethyl-2,6-octadien-1-yl acetate and molecular formula ($C_{12}H_{20}O_2$). The CAS registry number of Geranyl acetate is 105-87-3.

As used herein, the term "Geraniol" refers to a monoterpenoid with IUPAC name (Z)-3,7-Dimethyl-2,6-octadien-1-ol and molecular formula ($C_{10}H_{18}O$). The CAS registry number of Geraniol is 106-24-1.

As used herein, the term "Nerol acetate" or "Neryl acetate" refers to a monoterpene with IUPAC name (2Z)-3,7-Dimethyl-2,6-octadien-1-yl acetate and molecular formula ($C_{12}H_{20}O_2$). The CAS registry number of neryl acetate is 141-12-8.

As used herein, the term "Nerol" refers to a monoterpenoid with IUPAC name (Z)-3,7-dimethyl-2,6-octadien-1-ol and molecular formula ($C_{10}H_{18}O$). The CAS registry number of nerol is 106-25-2.

As used herein, the term "Caryophyllene" or "(−)-β-caryophyllene", is a natural bicyclic sesquiterpene with IUPAC name (1R,4E,9S)-4,11,11-Trimethyl-8-methylidenebicyclo[7.2.0]undec-4-ene and molecular formula ($C_{15}H_{24}$). The CAS registry number of caryophyllene is 87-44-5.

As used herein, the term "Caryophyllene oxide" refers to (1R,6R,10S)-4R,12,12-trimethyl-9-methylene-5-oxatricyclo[8.2.0.04,6]dodecane (CAS registry number: 1139-30-6). Caryophyllene oxide is a metabolite of caryophyllene in which the olefin has become an epoxide.

As used herein, the term "polysorbate" refers to derivatives of polyethoxylated sorbitan esterified with fatty adds, which are well known from the skilled person in the art as emulsifiers. The term "polysorbate 20" or "polyoxyethylene (20) sorbitan monolaurate" refers to a polysorbate-type nonionic surfactant formed by the ethoxylation of sorbitan before the addition of lauric add. The ethoxylation process leaves the molecule with 20 repeat units of polyethylene glycol; in practice these are distributed across 4 different chains leading to a commercial product containing a range of chemical species. (CAS Registry Number 9005-64-5)

As used herein, the term "citral" refers to 3,7-dimethyl-2,6-octadienal, also called lemonal (CAS Registry Number: 5392-40-5), and is either of, or a mixture of, a pair of terpenoids with the molecular formula $C_{10}H_{16}O$. The two compounds are double bond isomers. The E-isomer is known as geranial or citral A. The Z-isomer is known as neral or citral B. Citral as used herein may be neral, geranial or a mixture of both, such as a 50-50 mixture. Citral is known for its acaride repellent and acaricide properties at high concentrations. At low concentrations it is known as an acaride attractant.

The "reference mortality rate" is a measure of the number of deaths in a particular population, scaled to the size of that population, per unit of time in a reference system. Preferably this reference system is a system without any unusual influences, including but not limited to, temperature swings, mechanical, chemical or biological treatments. F The "treatment mortality rate" is a measure of the number of deaths in a particular population, scaled to the size of that population, per unit of time in a system that is treated with one or several chemical compounds.

As used herein, the term "non-lethal" refers to a ratio between the treatment mortality rate and the reference mortality rate lower than 5. Treatments or substances that lead to a ratio higher than 5 are called "lethal".

As used herein the term "migration" means causing acarids to move from a place, where they were living, to another place. The term "Migrated population" is defined as the ratio of the population in the latter place to the initial population in the former place. In other words the "migrated population" is the fraction of the population that migrated.

As used herein the term "attracting" means directional migration: causing acarids to move from a place, where they were living, to another place, where the source of attraction is located. In one embodiment, the source of attraction is an attracting agent. In one embodiment, attracting does not mean repelling, immobilizing nor killing.

As used herein the term "migration rate" or "migration speed" is defined as the distance from the center of the acarid population to the source of attraction divided by the time required for a relative part of the population, preferably 50%, to reach the source of attraction. The migration rate can only be used as a quantitative measurement in well controlled experiments. Unless otherwise mentioned, the migration rate will be treated as a qualitative measurement only.

The present invention relates to methods, products, kits and in particular compositions for attracting, trapping, removing and/or eliminating acarids, in particular in a household setting. The present invention also relates to the use of such methods, products, compositions and kits for attracting, trapping, removing and/or eliminating acarids, in particular in a household setting.

To this extent, a method is disclosed for attracting and/or holding acarids, comprising the steps of:
a) providing a sheet having interstices sufficiently large and a thickness sufficiently large to hold acarids; and
b1) applying on said sheet an aqueous synergistic solution comprising a non-lethal dose per area of an aqueous solution of an attractant, wherein said attractant is limonene, several attraction enhancers, preferably citronellal, linalool, geranyl acetate, caryophyllene, caryophyllene oxide and/or neryl acetate, and an emulsifier, preferably polysorbate.
b2) applying on said sheet an aqueous synergistic solution comprising a non-lethal dose per area of an aqueous solution of the essential oils of *Melissa Officinalis* and/or *Cymbopogon citratus* and/or *Cymbopogon fluxuosus citraliferum*, preferably *Melissa Officinalis* and *Cymbopogon fluxuosus citraliferum*, and an emulsifier, preferably polysorbate.

Essentially, a sheet is provided which is to be put on a surface of an object in which acarids live. Before or after placing the sheet on the surface, a composition is applied on the sheet which attracts acarids. After applying the impregnated sheet on the surface, acarids are attracted by the attracting composition, will migrate into the sheet and are thus effectively eliminated from the object. It is to be understood that the sheet, as used herein has interstices and a thickness sufficiently large to hold acarids. To this end, the sheet is to an extent porous, such that acarids can migrate into the sheet. The skilled person will understand that, according to the type of acarids to be trapped, the porosity and thickness of the sheet may be varied accordingly, as sizes of acarids may vary depending on the species.

The non-lethal dose of attractant and attractant enhancers to be applied to the sheet as described herein is preferably comprises between about $10^{-2}\ \mu L/m^2$ and $10^4\ \mu L/m^2$, such as between (about) $10^{-2}\ \mu L/m^2$ and $10^3\ \mu L/m^2$, $10^{-2}\ \mu L/m^2$ and $10^2\ \mu L/m^2$, $10^{-2}\ \mu L/m^2$ and $10\ \mu L/m^2$, $10^{-2}\ \mu L/m^2$ and $1\ \mu L/m^2$, $10^{-1}\ \mu L/m^2$ and $1\ \mu L/m^2$. Preferably, the dose is between (about) $10^{-2}\ \mu L/m^2$ and $10^2\ \mu L/m^2$, more preferably between (about) $5\times10^{-2}\ \mu L/m^2$ and $10\ \mu L/m^2$, even more preferably between (about) $5\times10^{-2}\ \mu L/m^2$ and $5\ \mu L/m^2$, most preferably between $10^{-2}\ \mu L/m^2$ and $1\ \mu L/m^2$, between $5\times10^{-2}\ \mu L/m^2$ and $5\times10^{-1}\ \mu L/m^2$ or between $5\times10^{-2}\ \mu L/m^2$ and $1\ \mu L/m^2$. These values and ranges may apply to the attractant limonene and each of the individual attractant enhancers or may apply to the total combined dose of attractant and attractant enhancers. In a preferred embodiment, these values refer to the total combined dose of attractant and attractant enhancers.

In the present invention, the acarid attracting composition is non-toxic for humans, but also non-lethal for acarids. This is important for the efficacy of the trap, as some acarids have been shown to release an alarm pheromone when in distress. These pheromones act as a repellant, warning other acarids and preventing further migration into the sheet. Even if lethal removal of acarids is the goal, killing acarids while the trap is contacting the acarid habitat has a negative impact on the efficacy of the trap.

In another embodiment, the composition described herein comprises of 103 and 10-4 ng/µL limonene. Preferably between 101 and 10-3 ng/µL limonene. More preferably between 10-1 and 10-2 ng/µL limonene. Most preferably between 100 and 10-2 ng/µL limonene. Limonene is the main acarid attractant in the composition. It is relatively stable and has a long shelf life. It leads to a high migration rate even at low concentrations, but too high concentrations lead to repellent and even acaricides effects. As such, high concentrations should be avoided and dosage control is paramount to the invention.

In another embodiment, the attraction enhancer of said composition comprises of 103 and 10-4 ng/µL citronellal. Preferably between 101 and 10-3 ng/µL citronellal. More preferably between 10-1 and 10-2 ng/µL Citronellal. Most preferably between 100 and 10-2 ng/µL citronellal. In a further embodiment, the attractant enhancer citronellal is replaced by its alcohol citronellol or, preferably, a mix thereof. Citronellal acts as a mild acarid attractant with a slower rate of migration than limonene on its own. When tested with limonene for long contact times, it increased the migrated population to nearly 1, meaning almost full migration.

In another embodiment, the attraction enhancer of said composition comprises of $10^3$ and $10^{-4}$ ng/μL linalool. Preferably between $10^1$ and $10^{-3}$ ng/μL linalool. More preferably between $10^{-1}$ and $10^{-2}$ ng/μL linalool. Most preferably between $10^0$ and $10^{-2}$ ng/μL linalool. Linalool is a known insecticide against fleas and fruit flies. At low doses, it did not appear to have a significant attracting effect on acarids when used alone. However, a significant increase in the migrated population after a set time was observed when Linalool was combined with Limonene and other attractants.

In another embodiment, the attraction enhancer of said composition comprises of $10^3$ and $10^{-4}$ ng/μL geranyl acetate. Preferably between $10^1$ and $10^{-3}$ ng/μL geranyl acetate. More preferably between $10^{-1}$ and $10^{-2}$ ng/μL geranyl acetate. Most preferably between $10^0$ and $10^{-2}$ ng/μL geranyl acetate. In a further embodiment, the geranyl acetate is replaced with its alcohol geraniol or, preferably, a mix thereof.

In another embodiment, the attraction enhancer of said composition comprises of $10^3$ and $10^{-4}$ ng/μL neryl acetate. Preferably between $10^1$ and $10^{-3}$ ng/μL neryl acetate. More preferably between $10^{-1}$ and $10^{-2}$ ng/μL neryl acetate. Most preferably between $10^0$ and $10^{-2}$ ng/μL neryl acetate. In a further embodiment, the neryl acetate is replaced with its alcohol nerol or, preferably, a mix thereof.

Neryl acetate and nerol have a similar acarid attractant effect as neral and geranyl acetate and geraniol have a similar acarid attractant effect as geranial. In both cases, the acetate and alcohol forms are less active and less volatile, but lead to a higher migrated population after long duration. Considering the acaride repellent features at high doses along with the short shelf life of neral, this makes neryl acetate and nerol more suitable for their use as a controlled acarid attraction enhancer. Without being bound by theory, it is possible that nerol and neryl acetate aren't active, but act through a chemical equilibrium with neral, where neral is active on acarids. If this is true, nerol and neryl acetate act as a way to have slow, controlled release of citral which is consequently removed by its high volatility. Regardless of the underlying mechanism, it was found that these substances work very well in combination with limonene to achieve fast and almost full migration acarids.

The main difference between attractant limonene and the attraction enhancers is that, at the doses described herein, the attraction enhancers do not have a significant migration rate when used alone. However, when used in combination with other attractants and attraction enhancers, the migration rate and migrated population was significantly higher than any attractant without enhancers. Increasing attractant concentration did not lead to increased migration, but increasing the amount of attractant enhancers while keeping the concentrations low did have a significant effect on the migration speed and migrated population.

This invention with composition according to claim 1 comprises an emulsifier. Said emulsifier disperses the attractant and attraction enhancers in water. In a preferred embodiment, said emulsifier comprises Polysorbate 20. In a preferred embodiment, said emulsifier comprises 0.1-100 ng/μL polysorbate 20. In a particularly preferred embodiment, said emulsifier comprises 1-10 ng/μL polysorbate 20. A suitable emulsifier is very important both for production as for application. Without the emulsifier, the dispersion of the aqueous solution is insufficient, leading to high variations in dosages. Too low doses are inactive where as too high doses are acarid repellent.

In a preferred embodiment, said aqueous composition comprises between $10^{-2}$ and $10^3$ ng/μL essential oils from *Melissa officinalis* and/or *Cymbopogon citratus* and/or *Cymbopogon flexuosus citraliferum*. More preferably between $10^{-1}$ and $10^2$ ng/μL essential oils from *Melissa officinalis* and/or *Cymbopogon citratus* and/or *Cymbopogon flexuosus citraliferum*. More preferably between 1 and 10 ng/μL essential oils from *Melissa officinalis* and/or *Cymbopogon citratus* and/or *Cymbopogon flexuosus citraliferum*. Most preferably about 3.5 ng/μL essential oils from *Melissa officinalis* and about 3.6 ng/μL *Cymbopogon flexuosus citraliferum*. The ratio of the concentrations of the essential oils from *Melissa officinalis* and *Cymbopogon flexuosus citraliferum* is preferably between 10:1 and 1:10. A synergistic mixture of the essential oils of these plants is ideally suitable for the attraction of acarids, as it contains a wide variety of attractants and attraction enhancers which act together synergistically leading to both high rates of migration and high migrated population after a relatively short time.

The composition of essential oils are typically subject to variations. This is partly because the plants of which the oils are extracted don't have a constant composition. Additionally, the majority of the components are highly volatile compounds. Production of a composition as claimed herein, as well as transport and storage of both ingredients and products needs to take the high volatility of compounds into account. The essential oil of *Cymbopogon flexuosus citraliferum* contains large amounts of citral. Shelf life tests of a particularly preferred embodiment of said composition comprising the essential oil of *Cymbopogon flexuosus citraliferum* showed that no citral was present. Surprisingly, the composition comprising the essential oil of *Cymbopogon flexuosus citraliferum* without citral was more effective at attracting and promoting migration in acarids, thus proving citral is neither a needed nor a desired component in this synergistic composition.

When more than one active ingredient is mixed in the compositions as described herein, the mixture may comprise any ratio of the concerning active ingredients. By means of example, two active ingredients may be present in a composition in a ratio (volume/volume) between about 100:1 and 1:100, for instance (about) 90:1, 80:1, 70:1, 60:1, 50:1, 40:1, 30:1, 20:1, 10:1, 1:10, 1:20, 1:30, 1:40, 1:50, 1:60, 1:70, 1:80, or 1:90. Ina preferred embodiment, two active ingredients are present in the composition in a ratio of 10:1 to 1:10. For instance, *Melissa officinalis* and *Cymbopogon flexuosus citraliferum* may be present in a ratio of about 5:1 to 1:5.

The compositions as defined herein may comprise additional ingredients, active or inactive with respect to attracting acarids. Preferably, if the composition comprises additional ingredients, these are neutral with respect to acarids, i.e. these do repulse, or kill acarids. A particular suited additional ingredient into the compositions as defined herein is eucalyptol (1,3,3-Trimethyl-2-oxabicyclo [2.2.2.]octane).

When the composition as described herein is applied to the sheet, the sheet preferably has a relative humidity comprised between about 30% and about 80%, such as between (about) 40-80%, preferably between 50-75% before being placed onto the object containing acarids or suspected of containing acarids. Depending on the quantity of the composition to be applied per area of sheet, which in its turn depends on the concentration of the active ingredients in the composition, the sheet may need to be dried before contacting it with an object to be treated. The drying may be performed passively, such as by passive equilibration with ambient humidity conditions. Alternatively, the drying may be performed actively, such as for instance, without limitation, by applying heat to evaporate excessive moist. The concentration of the active ingredients in the compositions as described herein may also be chosen such that application of the required amount of the composition resulting in the required dose per unit area automatically results in the required relative humidity as well.

A person trained in the arts understands that the sheet as described herein can be any sheet. A technical sheet, which has been optimized for the attraction of acarids, has obvious advantages for this purpose. However, the present invention is not limited to technical sheets. In fact almost any sheet will suffice to attract acarids. In another embodiment, any sheet, including but not limited to, bedding or bed linen can be employed.

Preferably, the sheet comprising the acarid attracting composition is contacted with an object for at least 0.5 hour or about 0.5 hour, more preferably for at least 1 hour or about 1 hour, even more preferably for at least 2 hour or about 2 hour. The sheet may be contacted for (about) 0.50, 0.75, 1.00, 1.25, 1.50, 1.75, 2.00, 2.25, 2.50, 2.75, 3.00 hours or more.

According to the methods as described herein, the object containing acarids, or suspected of containing acarids which is to be contacted, such as covered, with the sheet comprising the acarid attracting composition, may advantageously be dried before contacting with the sheet. As used herein, the term drying preferably refers to an equilibration with ambient humidity conditions. The drying step is thus most beneficial to be applied to objects which may be subject to humid conditions. For instance, a mattress which has been slept on may be more humid than ambient conditions due to transpiration of the individual sleeping on it. Preferably, the object, in particular a mattress, may be dried for several hours. The drying may be performed passively, such as by passive equilibration with ambient humidity conditions.

Alternatively, the drying may be performed actively, such as for instance, without limitation, by applying heat to evaporate excessive moist. In an embodiment, the object to be covered with the sheet as described herein may be dried for at least about 1 hour, such as for instance (about) 1, 2, 3, 4, 5, 6, 7, 8, 9, 10 or more hours. In a preferred embodiment, the object is dried for at least about 3 hours, more preferably for at least about 5 hours, even more preferably for about 7 hours or 7 hours.

In order to remove or eliminate the acarids, the sheet after being contacted with the object containing the acarids is removed from the object. The acarids residing in the sheet are thus effectively removed and eliminated from the object. In order to remove the acarids from the sheet, the sheet may be washed and/or frozen. Both methods result in killing of the acarids.

When the sheet is washed, the acarids will also at the same time be removed from the sheet during the washing process. Any conventional washing process may be applied, such as for instance in a washing machine. Detergent may or may not be added during the washing process. Preferably detergent is added, as such aids in killing the acarids. It will be understood that the skilled person may determine the washing conditions according to the composition of the sheet, as for instance certain fabrics do not tolerate washing at high temperatures, while others do not tolerate certain types of detergent.

Freezing the sheet can be performed by subjecting the sheet to temperatures below 0° C., preferably below about −10° C., such as below (about) −15° C. or −20° C. Preferably, the sheet is frozen for at least about 0.50 hour, such as (about) 0.50, 1.00, 1.25, 1.50, 1.75, 2.00, 2.25, 2.50, 2.75, 3.00, or more hours. The skilled person will understand that depending on the size of the sheet, longer periods may apply for the sheet to be completely frozen. After freezing, the sheet may be thawed, after which the dead acarids may be removed for instance mechanically, such as by shaking the sheet. Additionally, the sheet may be washed, as described before.

The invention further relates to a sheet as described herein, having interstices sufficiently large and a thickness sufficiently large to hold acarids, comprising a non-lethal dose per area of citral, limonene, and/or pinene, preferably all, whereby said non-lethal dose per area attracts acarids. Preferably, the sheet does not contain toxic substances, such as pesticides or acaricides, or at least does not contain such components in amounts sufficient to kill acarids.

The invention further relates to a kit comprising a sheet as described herein and/or a composition as described herein. Such kit may thus comprise a sheet already impregnated with the composition as described herein, at a dose as described herein. Alternatively, the sheet may not yet be impregnated with the composition as described herein. The composition may be additionally provided in the kit. In addition, the kit may comprise instructions for applying the composition onto the sheet and/or instructions for use, such as for applying the sheet on an object containing or suspected of containing acarids. Such instructions may include the dose to be applied, for instance the dose per are, but may also include, in addition or in the alternative guidance regarding the application of the composition, such as for instance guidance relating to the distance from which the composition needs to be sprayed onto the sheet. The instructions may further, or in the alternative comprise information regarding the time the sheet needs to be placed on the object to be treated, the drying time of the object before which the sheet is contacted with the objects, and/or the drying time or required relative humidity of the sheet before contacting it with the object to be treated.

The compositions according to the invention as described herein may be provided in a container, for instance a dispenser or an applicator such as a spray. Such dispensers or applicators are well known in the field. The applicator may be configured for continuous release of the composition, such that the user can determine the released amount of the composition for instance by continuously spraying during a specific time. Alternatively, and preferably, the applicator may be a unit dose applicator, such that the released amount of the composition is predetermined, i.e. the applicator or dispenser releases a discrete unitary dose per application. In a preferred embodiment, the disperser device can be a manual atomizer with a spray nozzle control that provides a defined quantity of attractive solution by unit of surface of the fabric. The skilled person will appreciate that when spraying with a dispenser, being it continuous or discrete, the distance between the dispenser and the target area may impact on the size of the area covered. For instance, when the composition exits the nozzle of the dispenser, the spray may widen proportionally with the distance from the nozzle to cover a larger area, when the distance from the target increases, i.e. the further the distance between the dispenser and the target area, the larger the target area will become. Hence, in order to achieve a particular dose per target area, the dispenser may need to be positioned at a predetermined distance from the target area, such that, taking into account the widening of the spray (e.g. after leaving the nozzle, the spray widens as a cone), and hence diluting over distance the amount of the composition per area, the preset dose per area is met. By means of example, and without limitation, if the dispenser releases a unit dose containing the amount of active ingredient needed to cover 200 $cm^2$, then the dispenser needs to be placed at a distance from the target such that 200 $cm^2$ is covered. Experiments showed that applying the aqueous composition by means of an aerosol spray had synergistic effects on acarid migration rate.

EXAMPLES

Example 1: Physical and Chemical Factors Affecting the Choice of Mites

Aim of the experiments: All experiments are tests of binary choice aiming to determine the preference of mites and the place where they prefer to stay (at least for 30 min).

Rearing: The species studied was *Dermatophagoides pteronyssinus*, a dust mite common in mattresses in Eurasia. Mites are reared in Petri dishes and fed with human skin flakes (skin and whiskers obtained by cleaning electric shavers). All mites were reared together under defined conditions (20° C. and 75% relative humidity). The experiments took place in a room kept at 20° C. and 40% relative humidity.

Materials and methods: A group of mites (20<n<40) was placed in the centre of a Petri dish (∅=5.5 cm) around which two semi-circles of felt were placed (see FIG. 1). The pieces of felts were 70 mg/$cm^2$, their thickness was 2 mm. One felt is the control (control felt); the other felt is the felt with the tested item, for instance the felt that is impregnated with a chemical compound that is tested.

Mites move spontaneously towards one of the two felts. The number of mites that prefer to go to one side or another was counted and the distribution of these data was compared to a situation where mites have the choice between two identical pieces of felts (Kolmogorov-Smirnov tests).

Observations and counting of mites was made under binocular microscope (magnification 10*). The set-up is illuminated with a cold lamp (KL 1500 LCD, Schott®), the lighting is symmetric and the light intensity was 50 Klux. The experimental conditions were controlled in the room (T° C.: 19-22° C. and RH 40%).

A. Physical Factors Affecting the Choice of Mites

Experiment 1 Influence of Humidity of Sheet on Acarid Attractant Properties

Aim of the experiment: Mites can choose between felts that are moistened differently.

Materials and methods: The control piece of felt was at 40% RH (20° C., the conditions of the laboratory). The tested felts were at 40, 75, 85 and 100% humidity. To obtain felts at 75 and 85% humidity, the felts were placed, for at least one hour, in a room containing a radio-electronic humidifier (Brown B500, accuracy±2° HR) humidifying the atmosphere at 75 and 85% respectively. The humidity of the room was regularly controlled with a thermohygrometer (Oregon). To obtain tested felts at 100% RH, felts were simply soaked in water.

Results: The mites were less attracted or repelled by a felt moistened at 40 and 75% (Table 1). When the felt was at 80% RH and 100%, it became repulsive for mites. The same results are obtained with *Dermatophagoides farinae*.

TABLE 1

Influence of humidity on the choice of mites.

| Tested felt that are at a defined HR % | Control felt | Nb of trials | stat Test | Mean | Standard deviation |
|---|---|---|---|---|---|
| felt at 100% HR | felt at 40% HR | 30 | Stat diff | 0.01 | 0.02 |
| felt at 85% HR | felt at 40% HR | 30 | Stat diff | 0.35 | 0.13 |
| felt at 75% HR | felt at 40% HR | 30 | NS | 0.48 | 0.15 |
| felt at 40% HR | Felt at 40% HR | 30 | Control | 0.48 | 0.12 |

Nb: number,
Stat diff: statistically different,
NS: not significant,
HR: relative humidity Experiment 2 Influence of Sheet Density on Acarid Attractant Properties Aim of the experiments: Similar experiments were performed to determine the density of the felt preferred by mites.

Materials and methods: Mites choose between a felt of different density. All tested and control felts were impregnated with a 1 μL of Citral (dilution $10^{-6}$) (see below).

Results. The felt that was more attractive for mites has a density of 20 mg/$cm^2$ (Table 2). The same results are obtained with *Dermatophagoides farinae*.

TABLE 2

Influence of the density of the felt on the choice of mites.

| Tested felt | Control felt | Nb of trials | Test stat | Mean | Standard deviation |
|---|---|---|---|---|---|
| Felt with density 20 mg/cm² | Felt with density 70 mg/cm² | 30 | Stat diff | 0.63 | 0.17 |
| Felt with density 10 mg/cm² | Felt with density 20 mg/cm² | 30 | Stat diff | 0.32 | 0.14 |

Nb: number,
Stat diff: statistically different,
NS: not significant.

A. Trapping Cover Method (Behavioral Test—Trapping Cover Test)

Objective: Measure the percentage of mites that are attracted by the solution in the textile under similar conditions to those encountered by the user.

Type of dust mites: the studied species are *Dermatophagoides pteronyssinus*, the most common house dust mites in mattresses in Eurasia.

A piece of sheet of different density (10 cm×20 cm rectangle) is placed on mini mattresses (polyurethane; scale: 15× smaller than the usual mattresses) that have been 3 months preinfested with dust mites. The attractive solution is then sprayed onto the sheet. The sheet is left on the mattress for one hour. During that time, the dust mites migrate in the sheet.

The number of mites in the sheet and the mattress are then counted. Therefore, the experimenter retrieve the mites in the sheet/mattress by exposing it on a heating plate at 40° C. during 30 minutes (Bischoff's method), so the mites will go up and will be stuck on a black sticky paper placed on the top of the device. Counts are done 1 hour after the treatment and the exposure of the cover onto the infested simulated mattress. Results are given in Table 3.

TABLE 3

Effect of sheet density on acarid attractant effect of essential oil mixtures, determined in Trapping cover test.

| Sample | Sheet | Result* |
|---|---|---|
| Control: No treatment/solution | Textile 300 g/m² | 3% |
| Control: No treatment/solution | Beige Towel (100% cotton) 500 g/m² | 4% |
| Control: No treatment/solution | Dark grey Towel (100% cotton) 500 g/m² | 4% |
| Control: Water | Textile 300 g/m2 | 3% |
| Control: Water | Beige Towel (100% cotton) 500 g/m² | 4% |
| Control: Water | Dark grey Towel (100% cotton) 500 g/m² | 4% |
| *Melissa officinalis* essential oil (3.6 ng/µL) + *Cymbopogon* essential oil (3.5 ng/µL) + polysorbate 20 (4.4 ng/µL) | Textile 300 g/m² | 92% |
| *Melissa officinalis* essential oil (3.6 ng/µL) + *Cymbopogon* essential oil (3.5 ng/µL) + polysorbate 20 (4.4 ng/µL) | Beige Towel (100% cotton) 500 g/m² | 79% |
| *Melissa officinalis* essential oil (3.6 ng/µL) + *Cymbopogon* essential oil (3.5 ng/µL) + polysorbate 20 (4.4 ng/µL) | Dark grey Towel (100% cotton) 500 g/m² | 81% |

% mites attracted by the composition
*n repetitions = 10

The density of the textile slightly influences the effectiveness of the trap. Note however that at least 80% of mites were attracted, regardless the density of the sheet.

Experiment 3: Influence of Color of Sheet on Acarid Attractant Properties

Similar experimental set-ups were realized with colored felt and white felt.

TABLE 3

Influence of the color of the felt and the color combined with the active compound

| Test | Tested felt | Control felt | Nb of trials | Test stat | Mean | Standard deviation |
|---|---|---|---|---|---|---|
| Color | dark blue felt | white felt | 30 | diff stat | 0.63 | 0.17 |
| compound and color | blue felt + 1 µL citral (dil 10⁻⁶) | white felt + 1 µL $H_2O$ | 18 | diff stat | 0.84 | 0.14 |

Nb: number,
Diff stat: statistically different,
NS: not significant

Results: The mites preferably migrated towards the blue felt. In combination with citral, a migration of 84% of the mites toward the blue felt was obtained.

A. Trapping Cover Method (Behavioral Test—Trapping Cover Test)

Objective: Measure the percentage of mites that are attracted by the solution in the textile under similar conditions to those encountered by the user.

Type of dust mites: the studied species are *Dermatophagoides pteronyssinus*, the most common house dust mites in mattresses in Eurasia.

A piece of sheet of different density (10 cm×20 cm rectangle) is placed on mini mattresses (polyurethane; scale: 15× smaller than the usual mattresses) that have been 3 months preinfested with dust mites. The attractive solution is then sprayed onto the sheet. The sheet is left on the mattress for one hour. During that time, the dust mites migrate in the sheet.

The number of mites in the sheet and the mattress are then counted. Therefore, the experimenter retrieve the mites in the sheet/mattress by exposing it on a heating plate at 40° C. during 30 minutes (Bischoff's method), so the mites will go up and will be stuck on a black sticky paper placed on the top of the device. Counts are done 1 hour after the treatment and the exposure of the cover onto the infested simulated mattress. Results are given in Table 5.

TABLE 5

Effect of sheet color on acarid attractant effect of essential oil mixtures, determined in Trapping cover test.

| Sample | Sheet | Result* |
| --- | --- | --- |
| Control: No treatment | Beige towel (100% cotton, 500 g/m$^2$) | 3% |
| Control: No treatment | Dark grey towel (100% cotton, 500 g/m$^2$) | 4% |
| Control: Water | Beige towel (100% cotton, 500 g/m$^2$) | 3% |
| Control: Water | Dark grey towel (100% cotton, 500 g/m$^2$) | 4% |
| *Melissa officinalis* essential oil (3.6 ng/μL) + *Cymbopogon* essential oil (3.5 ng/μL) + polysorbate 20 (4.4 ng/μL) | Beige towel (100% cotton, 500 g/m$^2$) | 79% |
| *Melissa officinalis* essential oil (3.6 ng/μL) + *Cymbopogon* essential oil (3.5 ng/μL) + polysorbate 20 (4.4 ng/μL) | Dark grey towel (100% cotton, 500 g/m$^2$) | 81% |

% mites attracted by the composition
*n repetitions = 10

Experiment 4: Trapping Cover Method (Behavioral Test—Trapping Cover Test) on White Used Bed Linen Objective: Measure the percentage of mites that are attracted by the solution in the textile under similar conditions to those encountered by the user.

Type of dust mites: the studied species are *Dermatophagoides pteronyssinus*, the most common house dust mites in mattresses in Eurasia.

A used bed linen is placed on the infested simulated mattress (polyurethane; scale: 15× smaller than the usual mattresses) that have been 1 month preinfested with dust mites. The attractive solution is then sprayed onto the sheet. The sheet is left on the mattress for one hour. During that time, the dust mites migrate in the sheet.

The number of mites in the sheet and the mattress are then counted. Therefore, the experimenter retrieve the mites in the sheet/mattress by exposing it on a heating plate at 40° C. during 30 minutes (Bischoff's method), so the mites will go up and will be stuck on a black sticky paper placed on the top of the device. Counts are done 1 hour after the treatment and the exposure of the cover onto the infested simulated mattress. Results are given in Table 6.

TABLE 6

Effect of attractant effect of essential oil mixture applied on used bed linen, determined in Trapping cover test

| Treatment of the sheet | % of mites on the cover after 1 h |
| --- | --- |
| Control: No treatment | 4% |
| Control: Water | 7% |

TABLE 6-continued

Effect of attractant effect of essential oil mixture applied on used bed linen, determined in Trapping cover test

| Treatment of the sheet | % of mites on the cover after 1 h |
|---|---|
| *Melissa officinalis* essential oil (3.6 ng/µL) + *Cymbopogon* essential oil (3.5 ng/µL) + polysorbate 20 (4.4 ng/µL) | 82% |

% mites attracted by the composition
*n repetitions = 10

Experiment 5: Trapping Cover Method (Behavioral Test—Trapping Cover Test) on Real Mattress Objective: Measure the percentage of mites from a infested mattress that are attracted by the solution.

Type of dust mites: the studied species are *Dermatophagoides pteronyssinus*, the most common house dust mites in mattresses in Eurasia.

3 samples of 52.5×50 cm cut from a real mattress of 90×190 cm ("Doux rêve") were infested by a known number of dust mites *D. pteronyssinus*, sprayed with the control/composition of the invention and covered by the provided towel as described in the standard "trapping cover test" which was conducted on these three samples. The attractive solution is then sprayed onto the sheets. The sheets are left on the mattress for 30 min, one hour and two hours. As the purpose of the trial was to assess the time needed to capture the maximum number of mites, the number of mites trapped on the cover was measured after 30 minutes, 1 hour and 2 hours. The number of mites in the sheet and the mattress are then counted. Therefore, the experimenter retrieve the mites in the sheet/mattress by exposing it on a heating plate at 40° C. during 30 minutes (Bischoff's method), so the mites will go up and will be stuck on a black sticky paper placed on the top of the device. Counts are done 1 hour after the treatment and the exposure of the cover onto the infested simulated mattress. Results are given in Table 7.

TABLE 7

Effect of exposure time on acarid attractant effect of essential oil mixture applied on the provided towel as described in the standard trapping cover test

| Treatment on the sheet | % of mites on the cover after 30 min | % of mites on the cover after 1 h | % of mites on the cover after 2 h |
|---|---|---|---|
| Control: No treatment | 0.8% | 2.4% | 4.4% |
| Control: Water | 0.3% | 4.8% | 6.3% |
| *Melissa officinalis* essential oil (3.6 ng/µL) + *Cymbopogon* essential oil (3.5 ng/µL) + polysorbate 20 (4.4 ng/µL) | 70.8% | 91.8% | 95.4% |

In the conditions of this trial, with the provided sample, the mites' strain and the methodology used, the trial has proved that a 1-hour time of contact between the cover and a mattress containing mites is necessary to trap 90% of the mites *Dermatophagoides pteronyssinus*.

B. Chemical Factors Affecting the Choice of Mites

Aim of the experiments: In the experiments, the tested felt was impregnated with chemicals that may be chemical acarid attractants.

Materials and Methods:

Different compounds were tested: Citral, limonene, α-pinene, eucalyptol, lavendulol, polysorbate 20. The results are shown in table 4. Dust mites were attracted to the dilute citral ($10^{-6}$) but the citral $10^{-3}$ is repellent. The limonene (dil. $10^{-5}$) and the α-pinene (dil. $10^{-6}$) were attractive for mites. Eucalyptol, lavendulol and polysorbate 20 had no statistically significant effect.

TABLE 8

Influence of chemical compounds on the binary choice of dust mites

| Tested felt with attractive compounds | Control felt | Nb of trials | stat Test | Mean | Standard deviation |
|---|---|---|---|---|---|
| Dry Felt | Dry Felt | 30 | NS | 0.52 | 0.12 |
| Felt + 1 µL of Citral (dilution $10^{-6}$) | Felt + 1 µL $H_2O$ | 20 | Stat diff | 0.72 | 0.20 |
| Felt + 1 µL of Citral (dil $10^{-3}$) | Felt + 1 µL $H_2O$ | 30 | Stat diff | 0.23 | 0.20 |

TABLE 8-continued

Influence of chemical compounds on the binary choice of dust mites

| Tested felt with attractive compounds | Control felt | Nb of trials | stat Test | Mean | Standard deviation |
|---|---|---|---|---|---|
| Felt + 1 μL of Citral-0 | Felt + 1 μL H$_2$O | 30 | Stat diff | 0.03 | 0.03 |
| Felt + 1 μL of Limonene (dil. 10$^{-6}$) | Felt + 1 μL H$_2$O | 4 | NS | 0.48 | 0.13 |
| Felt + 1 μL of Limonene (dil. 10$^{-5}$) | Felt + 1 μL H$_2$O | 9 | Stat diff | 0.61 | 0.13 |
| Felt + 1 μL of ☐ α-pinene (dil. 10$^{-5}$) | Felt + 1 μL H$_2$O | 6 | NS | 0.45 | 0.31 |
| Felt + 1 μL of α-pinene (dil. 10$^{-6}$) | Felt + 1 μL H$_2$O | 9 | Stat diff | 0.58 | 0.32 |
| Felt + 1 μL of Eucalyptol (dil. 10$^{-6}$) | Felt + 1 μL H$_2$O | 5 | NS | 0.48 | 0.17 |
| Felt + 1 μL of Eucalyptol (dil. 10$^{-6}$) | Felt + 1 μL H$_2$O | 5 | NS | 0.51 | 0.13 |
| Felt + 1 μL of Lavendulol (dil. 10$^{-6}$) | Felt + 1 μL H$_2$O | 5 | NS | 0.46 | 0.28 |
| Felt + 1 μL of Lavendulol (dil. 10$^{-6}$) | Felt + 1 μL H$_2$O | 5 | NS | 0.51 | 0.22 |
| Felt + 1 μL of Polysorbate 20 (dil. 10$^{-6}$) | Felt + 1 μL H$_2$O | 5 | NS | 0.50 | 0.18 |
| Felt + 1 μL of Polysorbate 20 (dil. 10$^{-6}$) | Felt + 1 μL H$_2$O | 5 | NS | 0.53 | 0.24 |

Nb: number,
Stat diff: statistically different,
NS: not significant,
Dil: dilution

Example 2: Chemical Factors Influencing the Efficiency of the Trap

Essential Oil Composition:

Dried leaves of *Cymbopogon citratus*, *C. flexuosus citraliferum* and *Melissa officinalis* were cut into small pieces (less than 1×1 cm)) and subsequently were subjected to hydro-distillation for 3 h, using Clevenger-type apparatus, as known in prior art. Upon the completion of the hydrodistillation, the extracted essential oils were dried using anhydrous sodium sulfate and stored in sealed vials at low temperature (2° C.) before analysis.

It should be understood that the essential oil isolation can be performed buy any commonly used method known in the prior art, as long as said isolation process yields essential oils from *Cymbopogon* species and *Melissa officinalis*, which are characterized by the main constituents such as, but not limited to, citral, limonene, citronellal, linalool, geranyl acetate, geraniol, neryl acetate, nerol, caryophyllene and caryophyllene oxide.

Gas Chromatography:

GC analyses were performed, using a HP 6890 GC gas chromatograph equipped with a fused capillary column (30 m×320 lm i.d., film thickness 0.25 lm) coated with 5% Phenyl Methyl Siloxane (HP-5). Oven temperature was held at 50° C. for 2 min and then programed to 240° C. at a rate of 8° C./min. Detector (FID) temperature was 280° C. and injector temperature was 240° C. Nitrogen was used as carrier gas with a linear velocity of 30 ml/min. The percentages of compounds were calculated by the area normalization method, without considering response factors.

Gas Chromatography-Mass Spectroscopy

GC-MS analyses were carried out using a Varian 240 GC-MS system equipped with a VF-5 fused capillary column (30 m·0.25 mm i.d., film thickness 0.25 lm); oven temperature was 50-180 C at a rate of 5 C/min, transfer line temperature 250 C, carrier gas was helium with a flow rate of 1 ml/min, spilt ratio 1:20, ionization energy 70 eV, and mass range 35-390 a.m.u. The components of the oils were identified by comparison of their mass spectra with those of a computer library or with authentic compounds. The main compound so the analyzed essential oils are shown in Table 9.

TABLE 9

The content of the main constituents in essential oils of *Cymbopogon citratus*, *C. flexuosus citraliferum* and *Melissa officinalis*.

| Component | wt. % in *C. citratus* e. oil | wt. % *C. flexuosus citraliferum* e. oil | wt. % in *M. officinalis* e. oil |
|---|---|---|---|
| Limonene | 0.43 | 0.28 | 1.53 |
| Citronellal | 2.03 | 0.21 | 2.74 |
| Linalool | 2.03 | 2.61 | 1.18 |
| Nerol | 0.22 | 2.14 | 4.32 |
| Neral | 34.52 | 30.01 | 25.83 |
| Geraniol | 0.95 | 0.87 | 24.23 |
| Geranial | 39.86 | 33.10 | 11.46 |
| Geranyl acetate | 0.49 | 12.03 | 3.33 |

TABLE 9-continued

The content of the main constituents in essential oils of *Cymbopogon citratus*, *C. flexuosus citraliferum* and *Melissa officinalis*.

| Component | wt. % in *C. citratus* e. oil | wt. % *C. flexuosus citraliferum* e. oil | wt. % in *M. officinalis* e. oil |
| --- | --- | --- | --- |
| Caryophyllene | 0.20 | 0.53 | 5.66 |
| Caryophyllene oxide | 0.31 | 0.18 | 0.16 |

Abbreviation e.—essential

Rearing: The species studied was *Dermatophagoides pteronyssinus*, a dust mite common in mattresses in Eurasia. Mites are reared in Petri dishes and fed with human skin flakes (skin and whiskers obtained by cleaning electric shavers). All mites were reared together under defined conditions (20° C. and 75% relative humidity). The experiments took place in a room kept at 20° C. and 40% relative humidity.

Aim of the experiments: The aim was to test the trap in condition similar to the conditions that will be met by the user of the trap.

Materials and methods: The mattresses were built at a smaller scale (15× reduction) than usual mattresses. These mini-mattresses are made in polyurethane and covered by a cover in cotton. They were infested with mites since at least 3 months. The fabric was a felt of 20 mg/cm$^2$ and is a rectangle of 10 cm×20 cm. It was placed on the mini-mattress. Then the attractive solution was sprayed on the fabric with a spray bottle. The fabric was left in place on the mattress. During this time, the mites moved in the felt.

It is very difficult to count directly the mites hidden in the mattress and in the fabric. Therefore, we used a Berlese funnel which is a device that is usually used to separate insects from litter. Here, we used it to separate the mites form their mattress or from the fabric. The Berlese funnel uses a light bulb to heat and dry the mattress, thus driving the mites downwards through a screen and into a collecting jar containing some food and some water.

The principle is simple: Dust mites do not like light or excessive heat. They are attracted by a source of moisture and the smell of food. We therefore placed the mattress or blanket in the funnel (FIG. 2). The mites go downwards in the direction of the jar, then in the jar. The harvest of the jar containing the mites takes place after one day. Mites had then 24 hours to migrate to the jar collector.

As a substantial proportion of the population is immobile (moulting mites), trapping is less efficient than it would be otherwise and estimate of population size that is trapped are likely to be biased. To avoid this bias and make a proper assessment of the populations in infested mattresses, mattresses were carefully brushed with a soft brush at the end of the manipulation meaning that immobile mites and eggs also fall into the funnel. Fabric was carefully brushed too. The Berleze funnel was rinsed with ethanol. Thus, mites still on the inner wall of the funnel were driven by ethanol in the jar collector.

At the end of the experiment, the jar contained: the food used as attractive to mites, a small amount of water also used for attractive, mites, and ethanol. The jar was emptied into a Petri dish and we counted mites under binocular. Counting of mites were made under binocular microscope (magnification 10*). The set-up is illuminated with a cold lamp (KL 1500 LCD, Schott®).

The felt was sprayed with different combination of different attractive solutions: a solution of citral, a solution of citral+limonene. Then, tests were performed with two essential oils *Cymbopogon flexuosus citraliferum* and *Melissa officinalis*. These two oils contain citral, limonene, citronellal, linalool, geranyl acetate, geraniol, neryl acetate, nerol, caryophyllene and caryophyllene oxide.

The main chemical components of *Melissa officinal* oil are trans-ocimene, cis-ocimene, 3-octanone, methyl heptenone, cis-3-hexenol, 3-octanol, 1-octen-3-ol, copaene, citronellal, linalool, b-bourbonene, caryophyllene, a-humulene, neral, germacrene-D, geranial, geranyl acetate, d-cadinene, y-cadinene, nerol and geraniol.

The main compounds of *Cymbopogon flexuosus citraliferum* oil are alcohols (citronellol, geraniol) and aldehydes (at least 15% geranial and 10% neral).

The duo of the two essential oils is very attractive for mites. So we have tested different dilutions (from $10^{-6}$ to $10^{-2}$), different quantities (1 ml, 2 ml, 3 ml per 200 square cm).

In addition, the timing of the use of the trap has been explored.

Two different drying times were tested for the mattress (0 hours, 7 hours). When the mattress dried a longer time (7 h), the mites were more attracted by the fabric that is impregnated with an attractive solution.

The exposure time, meaning the period of time during the fabric is placed on the mattress, must be sufficient to let the place with living mites dry. Two different exposure times were tested (2 h, 1 h). The fabric is more efficient when it is placed on the mattress 2 hours than for 1 hour.

We also conducted tests with recycled felt made of polyester and with felt composed of 30 wt % wool (wool from sheep) and 70 wt % viscose.

Results: The results are presented in Table 5. The most efficient attractive solution is composed of *Melissa officinalis*, *Cymbopogon flexuosus citraliferum*, at a combined concentration of 0.000001 µL/µL, which equals 1 µL/l (in a 1:1 ratio). It is most efficient when the mattress is dried during 7 hours and the fabric is laid during 1 or 2 hours. An efficient quantity of solution that is sprayed can be 2 or 3 ml.

Several types of essential oils of *Melissa officinalis*, *Cymbopogon flexuosus citraliferum*, from different suppliers have been tested, all of which gave consistent results.

TABLE 10

Combination of various compositions and conditions

| Composition of the felt | solution/ 200 cm² | drying + exposure time | Attractive compounds | Dilution in solution | Nb of trials | trapped living mites |
|---|---|---|---|---|---|---|
| 100% polyester | 4 ml | 0 h + 2 h | Dry | 0.00001 | 7 | 4% |
| 100% polyester | 4 ml | 0 h + 2 h | H₂O | 0.00001 | 7 | 6% |
| 100% polyester | 4 ml | 0 h + 2 h | Citral | 0.00001 | 7 | 17% |
| 70% viscose/ 30% wool | 12 ml | 0 h + 2 h | Citral-limonene | 0.00001 | 6 | 22% |
| 70% viscose/ 30% wool | 8 ml | 0 h + 2 h | Citral-limonene | 0.00001 | 5 | 19% |
| 70% viscose/ 30% wool | 4 ml | 0 h + 2 h | Citral-limonene | 0.00001 | 5 | 19% |
| 70% viscose/ 30% wool | 3 ml | 0 h + 2 h | Citral-limonene | 0.00001 | 5 | 31% |
| 70% viscose/ 30% wool | 3 ml | 0 h + 2 h | C. flexuosus citraliferum | 0.00001 | 7 | 37% |
| 70% viscose/ 30% wool | 3 ml | 0 h + 2 h | M. officinalis | 0.01 | 8 | 31% |
| 70% viscose/ 30% wool | 3 ml | 0 h + 2 h | M. officinalis | 0.001 | 8 | 28% |
| 70% viscose/ 30% wool | 3 ml | 0 h + 2 h | M. officinalis | 0.0001 | 6 | 42% |
| 70% viscose/ 30% wool | 3 ml | 0 h + 2 h | M. officinalis | 0.00001 | 4 | 45% |
| 70% viscose/ 30% wool | 3 ml | 0 h + 2 h | M. officinalis | 0.000001 | 4 | 59% |
| 70% viscose/ 30% wool | 3 ml | 0 h + 2 h | C. flexuosus citraliferum | 0.01 | 3 | 41% |
| 70% viscose/ 30% wool | 3 ml | 0 h + 2 h | C. flexuosus citraliferum | 0.001 | 4 | 38% |
| 70% viscose/ 30% wool | 3 ml | 0 h + 2 h | C. flexuosus citraliferum | 0.0001 | 4 | 83% |
| 70% viscose/ 30% wool | 3 ml | 0 h + 2 h | C. flexuosus citraliferum | 0.00001 | 7 | 43% |
| 70% viscose/ 30% wool | 3 ml | 0 h + 2 h | C. flexuosus citraliferum | 0.000001 | 5 | 44% |
| 70% viscose/ 30% wool | 3 ml | 7 h + 2 h | C. flexuosus citraliferum | 0.000001 | 7 | 43% |
| Felt 100% recycle | 3 ml | 7 h + 2 h | C. flexuosus citraliferum | 0.000001 | 4 | 18% |
| Felt 100% recycle | 2 ml | 7 h + 2 h | C. flexuosus citraliferum | 0.000001 | 5 | 19% |
| 70% viscose/ 30% wool | 3 ml | 0 h + 2 h | M. officinalis, C. flexuosus citraliferum | 0.000001 | 7 | 22% |
| 70% viscose/ 30% wool | 3 ml | 7 h + 2 h | M. officinalis, C. flexuosus citraliferum | 0.000001 | 7 | 99% |
| 70% viscose/ 30% wool | 3 ml | 7 h + 1 h | M. officinalis, C. flexuosus citraliferum | 0.000001 | 7 | 87% |
| 70% viscose/ 30% wool | 2 ml | 7 h + 1 h | M. officinalis, C. flexuosus citraliferum | 0.000001 | 7 | 65% |
| 70% viscose/ 30% wool | 2 ml | 7 h + 2 h | M. officinalis, C. flexuosus citraliferum | 0.00001 | 7 | 96% |
| 70% viscose/ 30% wool | 2 ml | 7 h + 2 h | M. officinalis, C. flexuosus citraliferum | 0.00002 | 7 | 60% |

Nb: number

Example 3: Shelf Life and Storage of the Aqueous Solution

Aim of the Experiments:

Finding an appropriate storage material. Verifying the presence of volatile attractive molecules in fresh solutions (freshly produced, 1 day old) and stored solutions (8-12 months). Determining the quantity of those attractive molecules in said solutions, and thus allowing to follow said solutions' chemical profiles within time.

Materials and Methods:

An aqueous solution of 3.5 ng/μL essential oil from *Melissa officinalis*, 3.6 ng/μL essential oil from *Cymbopogon flexuosus citraliferum* and 5 ng/μL polysorbate 20 was produced, bottled and stored.

Bottle material test: Two types of 100-ml bottles were tested. A plastic and an aluminum bottle were produced (20 bottles for each material). The bottles were stored 1 month, and then tested for the presence of citral.

Long term shelf life test: 38 bottled solutions (stored 8-12 months) and 11 bottled fresh solutions (stored 1 day) were tested to compare the presence and quantity of citral and limonene.

Quantitative measurements for citral and limonene were done by gas chromatography (GC). These are well known in the art. The essential oils were extracted from 25 ml of said bottled solution using 2 ml of n-hexane (LC-MS or HPLC grade). A sample of (1 μl) of the n-hexane extract was injected in the GC-MS equipped with a mass detector and using an OPTIMA-5MS capillary column (30 m, 0.25 mm I.D., 0.25 mm film thickness). Programmed temperature elution was employed with an initial temperature of 40° C., then ramped to 280° C. at 8° C./min and held at 280° C. for 5 min. Helium was used as the carrier gas. Electron impact ionization was performed using an electron energy of 70 eV and a mass range of 40-800 m/z.

Results:

Bottle material test: These short term tests showed no significant difference between the plastic or aluminium bottles (7). Citral was present in each sample analysed.

TABLE 11

Bottle material test

| Bottle material | Neral | Geranial |
|---|---|---|
| Aluminium | 12.68% ± 0.18 | 12.56% ± 1.79 |
| Plastic | 12.63% ± 0.59 | 13.03% ± 1.25 |

Long term shelf life test: 9 standard solutions were analyzed to determine the frequency of occurrence of volatile attractive molecules (limonene & citral) in freshly produced solutions. The presence of both limonene (0.25 ng/µL±0.02; mean±St. Dev.) and citral (10.37 ng/µL±0.9) was observed in each of the solutions.

38 stored solutions were analyzed 8-12 months after production. Limonene was present in all solutions analyzed. Concentrations of Limonene varied between 0.01 and 0.28 ng/µL (0.081 ng/µL±0.066). Citral was not detected in any solutions.

While Limonene was still present in samples after 12 months' storage (presence in all solutions tested, N solutions=38, N standard=9), citral was detected only in fresh solutions (standards). This proves that limonene is more stable (persisting over time) than citral (very highly volatile molecule). The fresh and stored solutions were tested for acarid attractant properties through the binary test (See example 1). There was no significant difference between the fresh and the stored solutions. This indicates that the presence of citral is not required, nor synergistic, for the acarid attractant solution.

Example 4: Elimination of the Mites from the Sheet

When the dust mites are in the fabric, to eliminate mites, the fabric is then placed in the washing machine. All mites were killed by water temperatures 55° C. or greater (Mc Donald & Tovey 1992, Andersen & Roesen 1998). According to other authors, it is possible to achieve mite control in delicate garments by washing at low temperature in the presence of a mite control additive providing a final concentration of 0.03% benzyl benzoate (Bischoff et al 1998). After washing, when the fabric is dry, it can again be placed on another places with living mites, the fabric can be impregnated with the attractive solution by means of the disperser device and can be used once again to trap dust mites (Colloff 2009).

It is also possible to kill the mites in the fabric by killing them in a freezer. A temperature of −20° C. for 30 min. achieved almost 100% mortality, indicating that a standard domestic freezer could be used for killing mites in relatively small items such as soft toys, pillows and items of clothing that cannot be hot washed. After the passage in the freezer, the user must shake the fabric to get rid of the dead dust mites (Colloff 2009)

Example 5: Effects on *Dermatophagoides farinae*

Example 2 was repeated with mite species *Dermatophagoides farinae*. The results are presented in 12.

TABLE 12

Effects on *Dermatophagoides farinae*

| Composition of the felt | solution/ 200 cm² | drying + exposure time | Attractive compounds (1:1 ratio) | Dilution in solution | Nb of trials | trapped living mites |
|---|---|---|---|---|---|---|
| 70% viscose/ 30% wool | 3 ml | 7 h + 2 h | *M. officinalis*, *C. flexuosus citraliferum* | 0.000001 | 7 | 45% |

Nb: number

From Table 12 it is clear that the compositions and methods according to the invention are also suitable for attracting and trapping *Dermatophagoides farinae*.

Example 6: Effects of Sheet Processing on Removal of the Mites

Sheets of 200 cm² were infested with 30 mites. After infestation, the sheets were submitted to three different treatments (10 sheets per treatment):

(1) freezing, followed by shaking (2) freezing without subsequent shaking (3) washing in a washing machine at 50° C. for 30 minutes without addition of soap After the treatment, the sheets were submersed in a solution saturated with NaCl and shaken to remove the mites from the sheet. Due to the difference in density between the mites and the NaCl solution, the mites float on the surface and become concentrated, which allows easy extraction.

The three different treatments yielded statistically significant differences (Kruskall-Wallis test p<0.0001). It was shown that treatment (1) and treatment (3) gave similar results (post hoc Dunn's test).

These results show that the mites which have been trapped in the sheets according to the invention can be effectively removed.

Example 7: Clinical Trials

A kit as described herein was sent by the post mail to 23 allergic patients. This kit included a textile support, a spray and instructions for use. The spray comprised an aqueous solution of 3.5 ng/µL essential oil from *Melissa officinalis*, 3.6 ng/µL essential oil from *Cymbopogon flexuosus citraliferum* and 5 ng/µL polysorbate 20.

There was telephone contact with most of the patients and some advice was given about the use of said solution. More general advices about the management of house dust mites were also given such as lower the humidity, select appropriate furniture, wash all bedding regularly, vacuum the allergens with a vacuum system equipped with HEPA filter and avoid chemicals.

For these users of said kit, the modus operandi was to put a textile support on the mattress, to spray an attractive solution on the textile, and, when the attracted mites were in the textile, to kill them by putting it and washing it in the washing machine with some soap. After the first use, it was strongly recommended to vacuum the mattress one time to eliminate the allergens left by mites. The users had enough attractive solution as to make 8 or 9 tests. The textile support was one size, sufficient to cover the surface of a single bed. When the patients were allergic adults, we sent them two textile supports to cover the entire surface of a double bed.

After two months, the patients were called by telephone. The conversations lasted 10 minutes on average. The following questions were asked 1) How many times said kit was used? 2) What were their symptoms before the use of said kit? 3) Do they observe some effect? If yes, was it an improvement or a total relief of the symptoms?

The results of this enquiry are shown in FIG. 1. The results of this enquiry were as follows: the kit was used 2.6±1.4 times on average. Of the enquired patients, 14 were suffering from rhinitis, 3 from conjunctivitis and 5 were asthmatic. As shown on FIG. 1, improvements were observed in the 3 types of symptoms.

For the 3 types of symptoms, in most of the cases, improvements were observed. In some cases, the symptoms had disappeared.

Patients with rhinitis used said kit and followed the advices on how to manage dust mites. It was worth noting that 2 of the 4 patients with rhinitis who observed no effect did not use said kit properly. One did not hoovered its mattress after the use of said kit as it is recommended. Thus the allergens produced by mites were still in the bed. In another case, too much attractive solution was sprayed on the mattress. The solution wetted the mattress and the mites did not come into the textile support. It was possible that the two last ones were not allergic to house dust mites but to other allergens. Patients suffering from asthma and conjunctivitis knew how to manage dust mites. The improvement of their symptoms could be linked to the use of said kit.

It is believed that the present invention is not limited to the embodiments described above and that some modifications or changes may be added to the examples described, without revaluing the appended claims. For example, the *Cymbopogon* spp. and/or *Melissa officinalis* essential oil composition in view of the main constituents, as shown in Table 9 of Example 2, can be different as it can be affected by various factor such as specific plant species and/or variety, geographical origin, climate, date of harvesting, soil type, and method of drying/preparing the raw material for extraction, specific extraction/isolation parameters and the like. Thus, the content of the main constituents can vary, without departing from the scope of the invention. Furthermore, any suitable method extraction method to obtain essential oils and/or the main constituents of *Cymbopogon* spp. and/or *Melissa officinalis* essential oil capable of exerting acarid attractant effect, can be used/employed to obtain said essential oils and/or constituents without departing from the scope of the present invention.

The invention claimed is:

1. A method for attracting and holding acarids, comprising of the steps:
   a) providing a sheet having interstices sufficiently large and a thickness sufficiently large to hold acarids;
   b) applying on said sheet a composition comprising a non-lethal dose per area of an aqueous synergistic solution for promoting non-lethal migration of acarids from their habitat towards a carrier comprising:
      1) $10^{-1}$ to $10^{-4}$ ng/µL of an attractant for the attraction of acarids, wherein said attractant is limonene,
      2) $10^{-1}$ to $10^{-4}$ ng/µL of one or more attraction enhancers chosen from the group citronellal, linalool, geranyl acetate, caryophyllene, caryophyllene oxide and/or neryl acetate, and
      3) an emulsifier, wherein the emulsifier is polysorbate; wherein said non-lethal dose per area promotes acarid migration.

2. The method according to claim 1, wherein the attractant comprises between $10^{-1}$ and $10^{-2}$ ng/µL limonene.

3. The method according to claim 1, wherein the attractant enhancer comprises between $10^{-1}$ and $10^{-2}$ ng/µL citronellal, with a concentration ratio between 10:1 and 1:100 of citronellal compared to limonene.

4. The method according to claim 1, wherein the attractant enhancer comprises between $10^{-1}$ and $10^{-2}$ ng/µL linalool, with a concentration ratio between 10:1 and 1:100 of linalool compared to limonene.

5. The method according to claim 1, wherein the attractant enhancer comprises between $10^{-1}$ and $10^{-2}$ ng/µL geranyl acetate, with a concentration ratio between 10:1 and 1:100 of geranyl acetate compared to limonene.

6. The method according to claim 1, wherein the attractant enhancer comprises between $10^{-1}$ and $10^{-2}$ ng/µL neryl acetate, with a concentration ratio between 10:1 and 1:100 of neryl acetate compared to limonene.

7. The method according to claim 1, wherein the attractant enhancer comprises between $10^{-1}$ and $10^{-2}$ ng/µL caryophyllene and/or caryophyllene oxide, with a concentration ratio between 10:1 and 1:100 of carophyllene and/or caryophyllene oxide compared to limonene.

8. The method according to claim 1, wherein additional terpene or terpenoids are used as attractant enhancer in a 10:1 to 0.001:1 ratio with limonene.

9. The method according to claim 1, wherein the emulsifier is between $10^4$ and $10^{-2}$ ng/µL polysorbate 20.

10. A method according to claim 3, wherein an additional attractant enhancer is present, wherein the additional attraction enhancer is citronellol.

11. A method according to claim 1, wherein an additional attraction enhancer is present, wherein the additional attraction enhancer is selected from geraniol and nerol or mixtures thereof.

12. The method according to claim 1, wherein the composition further comprises the essential oils of *Melissa officinalis* and/or *Cymbopogon citratus* and/or *Cymbopogon fluxuosus citraliferum*.

13. The method according to claim 12, comprising between $10^{-3}$ and $10^4$ ng/µL of the essential oils *Melissa officinalis* and/or *Cymbopogon citratus* and/or *Cymbopogon flexuosus citraliferum*, with a concentration ratio between 10:1 and 1:10 of the essential oils from *Melissa officinalis* and *Cymbopogon flexuosus citraliferum*.

* * * * *